United States Patent [19]

Sandusky et al.

[11] Patent Number: 5,587,041
[45] Date of Patent: Dec. 24, 1996

[54] COMPOSITE PREPREG APPLICATION DEVICE

[75] Inventors: Donald A. Sandusky, Williamsburg; Joseph M. Marchello, Hampton, both of Va.

[73] Assignee: The United States of America as represented by the Administrator of the National Aeronautics and Space Administration, Washington, D.C.

[21] Appl. No.: 457,608

[22] Filed: Jun. 1, 1995

Related U.S. Application Data

[62] Division of Ser. No. 411,231, Mar. 21, 1995, abandoned.

[51] Int. Cl.⁶ ........................................ B65H 81/00
[52] U.S. Cl. ................ 156/441; 156/166; 156/169; 156/175; 156/425; 156/433; 156/498; 156/574
[58] Field of Search ........................... 156/425, 433, 156/441, 523, 499, 498, 574, 166, 169, 173, 175

[56] References Cited

U.S. PATENT DOCUMENTS

| | | | |
|---|---|---|---|
| 4,804,509 | 2/1989 | Angell, Jr. et al. | 264/136 |
| 4,915,771 | 4/1990 | O'Brien et al. | 156/574 |
| 4,990,213 | 2/1991 | Brown et al. | 156/499 X |
| 4,992,133 | 2/1991 | Border | 156/499 X |
| 5,045,147 | 9/1991 | Benson et al. | 156/498 X |

FOREIGN PATENT DOCUMENTS 0463611  1/1992  European Pat. Off. .

OTHER PUBLICATIONS

Ermert, W, et al, "Ru Reinforcing Plastics with robots?" *Plastics Engineering*, May 1981, pp. 37–46.

Klein, Allen, "Automated tape laying", *Advanced Composites*, Jan./Feb. 1989, pp. 44–52.

*Primary Examiner*—Jeff H. Aftergut
*Attorney, Agent, or Firm*—George F. Helfrich

[57] ABSTRACT

A heated shoe and cooled pressure roller assembly for composite prepreg application is provided. The shoe assembly includes a heated forward contact surface having a curved pressure surface. The following cooled roller provides a continuous pressure to the thermoplastic while reducing the temperature to approximately 5° C. below glass transition temperature. Electric heating coils inside the forward portion of the shoe heat a thermoplastic workpiece to approximately 100° C. above the glass transition. Immediately following the heated contact surface, a cooled roller cools the work. The end sharpened shape of the heated shoe trailing edge tends to prevent slag buildup and maintain a uniform, relaxed stress fabrication.

2 Claims, 4 Drawing Sheets

5,587,041

COMPOSITE PREPREG APPLICATION DEVICE

ORIGIN OF THE INVENTION

The invention described herein was made by contractor employees in the performance of work under a NASA contract. In accordance with 35 USC 202, the contractor elected not to retain title.

This is a divisional of application Ser. No. 08/411,231 filed on Mar. 21, 1995, now abandoned.

BACKGROUND OF THE INVENTION

The invention is related to the field of composite fabrication and in particular to devices providing product release, void compression and residual stress management in thermoplastic composites.

DESCRIPTION OF RELATED ART

The state of the art application devices were developed for thermoset technology. They are not functional for thermoplastic in situ fabrication because they cannot cause the appropriate heat transfer and squeeze flow mechanisms to occur. Thermoplastics have become a material of preference in certain fabrications, particularly lay-up of aerospace structures. Thermoplastics exhibit beneficial characteristics including more resilient and resistance to impact fractures, the ability to shape or mold, resistance to heat and fire, and retention of these characteristics at high temperatures. Recent thermoplastic matrix composites have withstood frictional temperature approaching that required for Mach 2 flight.

To achieve this level of performance with thermoplastic components, it is necessary to provide a material with uniform thickness, free of internal flaws, uniformly compacted, and with a low and uniform level of residual stress.

SUMMARY OF THE INVENTION

It is an object of the present invention to provide a composite prepreg application device which expels or compresses voids from thermoplastic composites.

It is another object of the invention to provide a composite prepreg application device which controls residual stress.

It is yet another object of the invention to provide a composite prepreg application device with improved product release during composite lay-up.

It is a further object of the invention to provide a composite prepreg application device which facilitates melt flow of the incoming prepreg during composite lay-up.

It is still another object of the invention to provide a composite prepreg application device which applies both high temperature and high pressure simultaneously during composite lay-up.

It is another object of the invention to provide a composite prepreg application device which applies both high pressure and a high cooling gradient immediately following the high temperature and pressure lay-up.

Accordingly, the invention is a device for composite prepreg application comprising a moving electrically heated shoe assembly having an attached cooled roller. The electrically heated shoe assembly is operated by a conventional robotic control mechanism known in the art. The special shape of the shoe provides a substantial transverse pressure load as a continuous pressure gradient to the prepreg material, that is, a continuously increasing load. The heated shoe is maintained at a temperature above (approximately 100° C. above) the glass transition temperature for the material being fabricated. Immediately following the tip of the heated shoe, a cooled roller both applies pressure and reduces the temperature slightly below (approximately 5° C. below) the glass transition temperature. The invention applies heat to a composite prepreg material with smoothly increasing pressure so as to reach a temperature above glass transition for purposes of causing wet outflow and consolidation and thereafter, immediately applies cooling to below glass transition temperature while maintaining a steady pressure on the material.

BRIEF DESCRIPTION OF THE DRAWINGS

For a more complete understanding of the present invention and for further objects and advantages thereof, reference is now made to the following description taken in conjunction with the accompanying drawings in which.

DETAILED DESCRIPTION OF THE INVENTION

Figure 1:
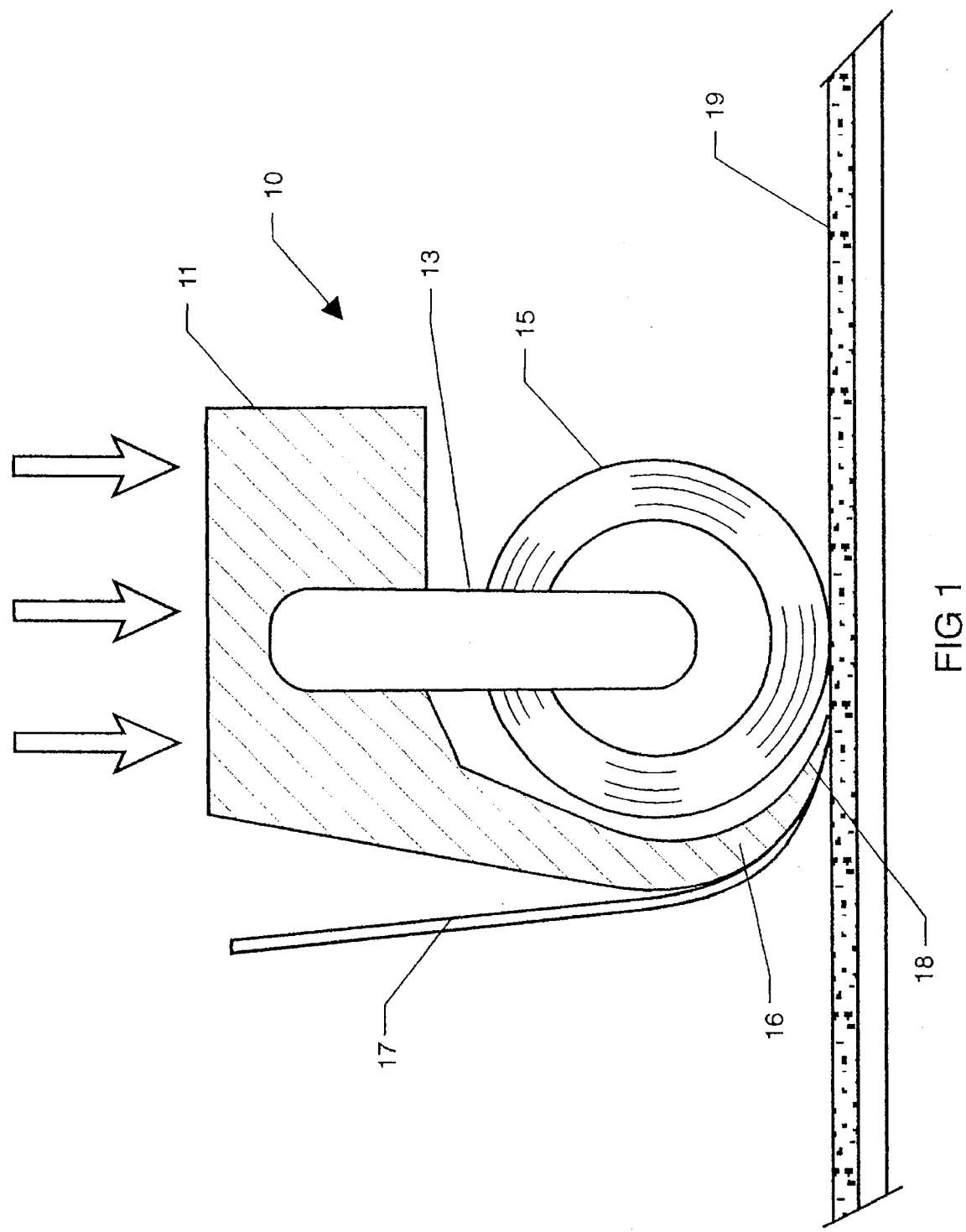
FIG. 1 is a side view of the composite prepreg application device.

Referring now to FIG. 1, the composite prepreg application device, designated generally by the reference numeral 10, is shown with its major components. The device comprises an attachment base 11 which is adapted for attachment to a conventional robotic lay-up machine. The attachment base 11 has support arms 13 on either end for attaching a pressure roller 15. A heated shoe assembly 16 is located on the fore section of the attachment assembly 11. The heated shoe assembly uses an electrical heater in the preferred embodiment, but any suitable heat source may be substituted. The pressure roller 15 is cooled by a cooling fluid delivered through support arms 13. During operation of the device, the heated shoe assembly 16 raises the temperature of the paver-coated prepreg tow 17 above the glass transition temperature, thereby providing a molten plastic to the composite 19 immediately behind the tip 18 of the heated shoe assembly. The heated shoe assembly has an elongated curving tow guide having a sharpened tip or trailing edge. This shape provides the steadily increasing pressure while the sharpened tip disperses slag preventing any build-up. Immediately thereafter, the composite reaches the pressure roller 15 where it is simultaneously compacted and cooled below glass transition temperature. The process allows the production of high quality, uniform lay-ups free of voids and free of variations in thickness or surface smoothness.

Figure 2:
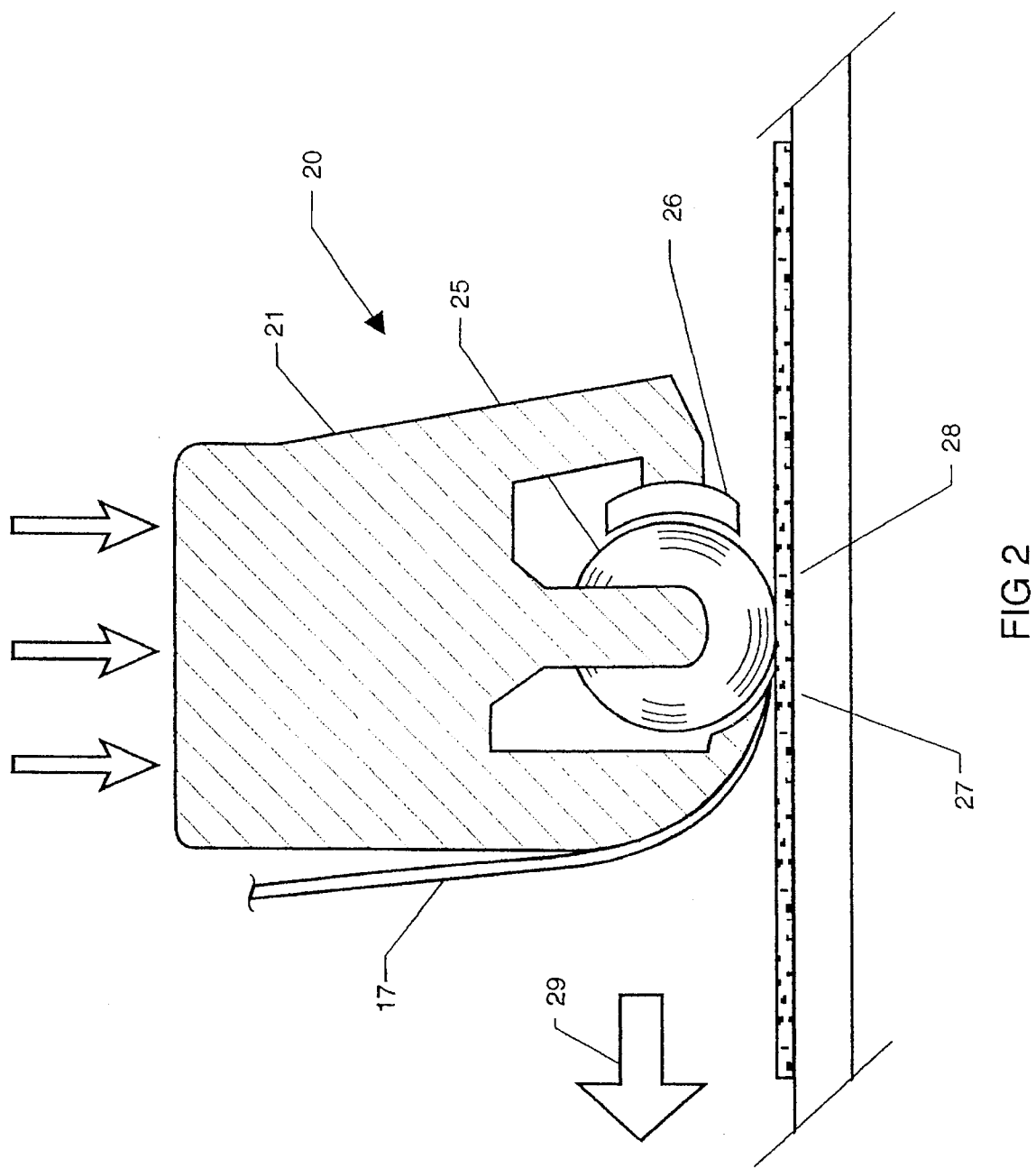
FIG. 2 is a side view of an alternative configuration of the application device.

Referring now to FIG. 2, an alternate embodiment 20 of the invention is shown using a second cooling arrangement. The attachment base 21 contains the heated shoe assembly as in the first embodiment, however, the pressure roller 25 has no internal cooling. Cooling is provided, instead, by a cooling shoe 26 which receives a cooling fluid directly from the attachment base 21. The temperature control of the incoming prepreg tow 17 is accomplished as in the preferred embodiment. The temperature of the prepreg tow is raised above glass transition temperature, depicted by point 27, and then is immediately cooled, under pressure to a temperature below glass transition temperature, depicted by point 28. During lay-up, the entire lay-up structure may be moved, or the robotic machine may move the application device. In the case of application device movement, the direction of movement is to the left in each figure, depicted by arrow 29 in FIG. 2.

Figure 3:
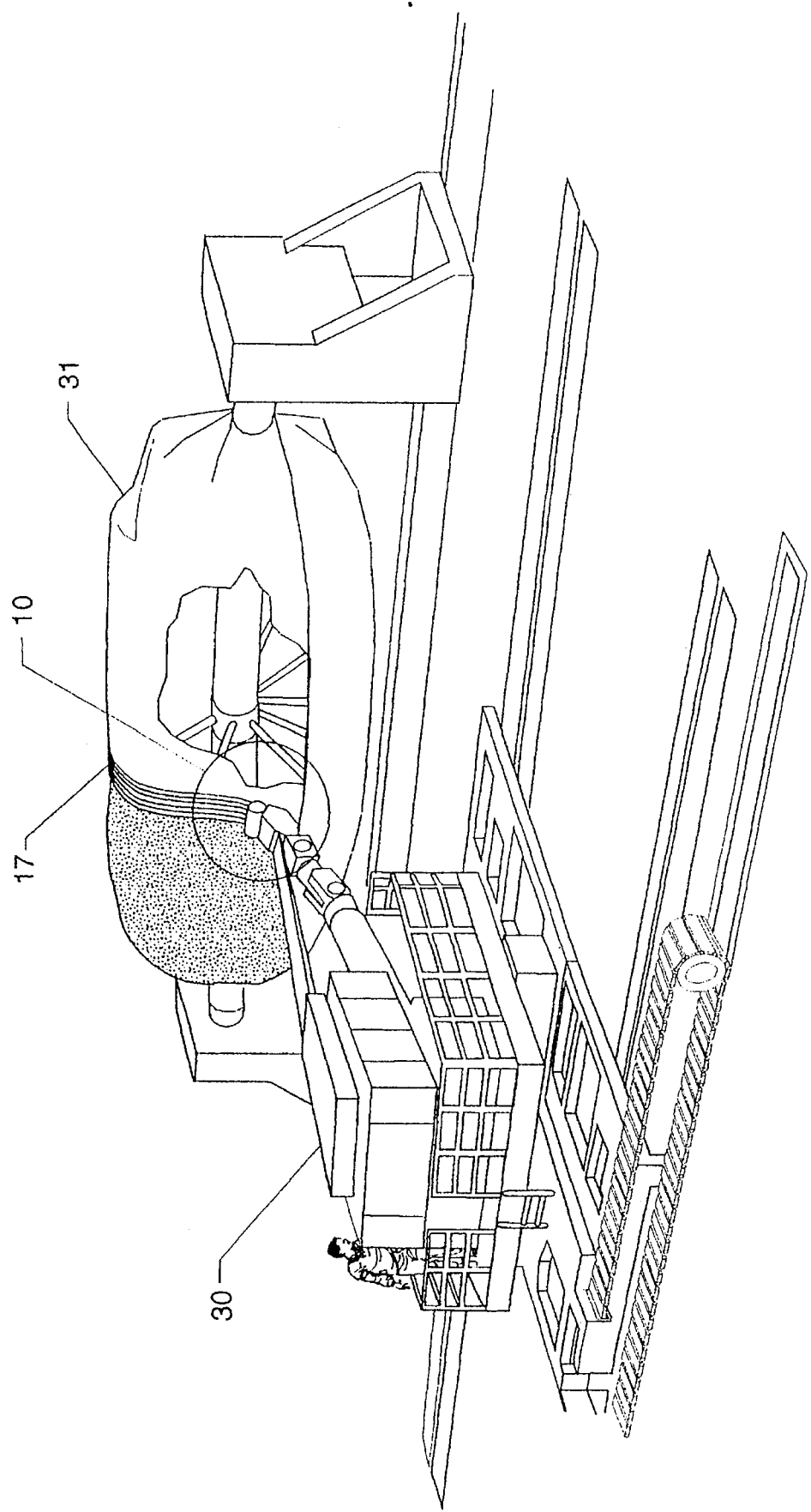
FIG. 3 is a side view of the application device as installed on a conventional robotic control mechanism.

The attachment of composite prepreg application device 10 when installed on a typical robotic lay-up machine may be seen by reference to FIG. 3. For attachment to a typical conventional robotic lay-up machine, the attachment base is a block shaped to be held by the conventionally known chucks commonly used on these machines. The block or bit forming the attachment base is fitted with electrical ports and cooling ports for providing heating energy and cooling energy to the applicator shoe and roller, respectively. The robotic machine 30 is used to apply powder-coated prepreg ribbon to a typical aerospace structure 31. As depicted here, the device 10 in this embodiment applies multiple ribbons of prepreg tow 17. By adapting the guide surface of the heated shoe, multiple side-by-side strips of prepreg tow may be applied simultaneously.

Figure 4:
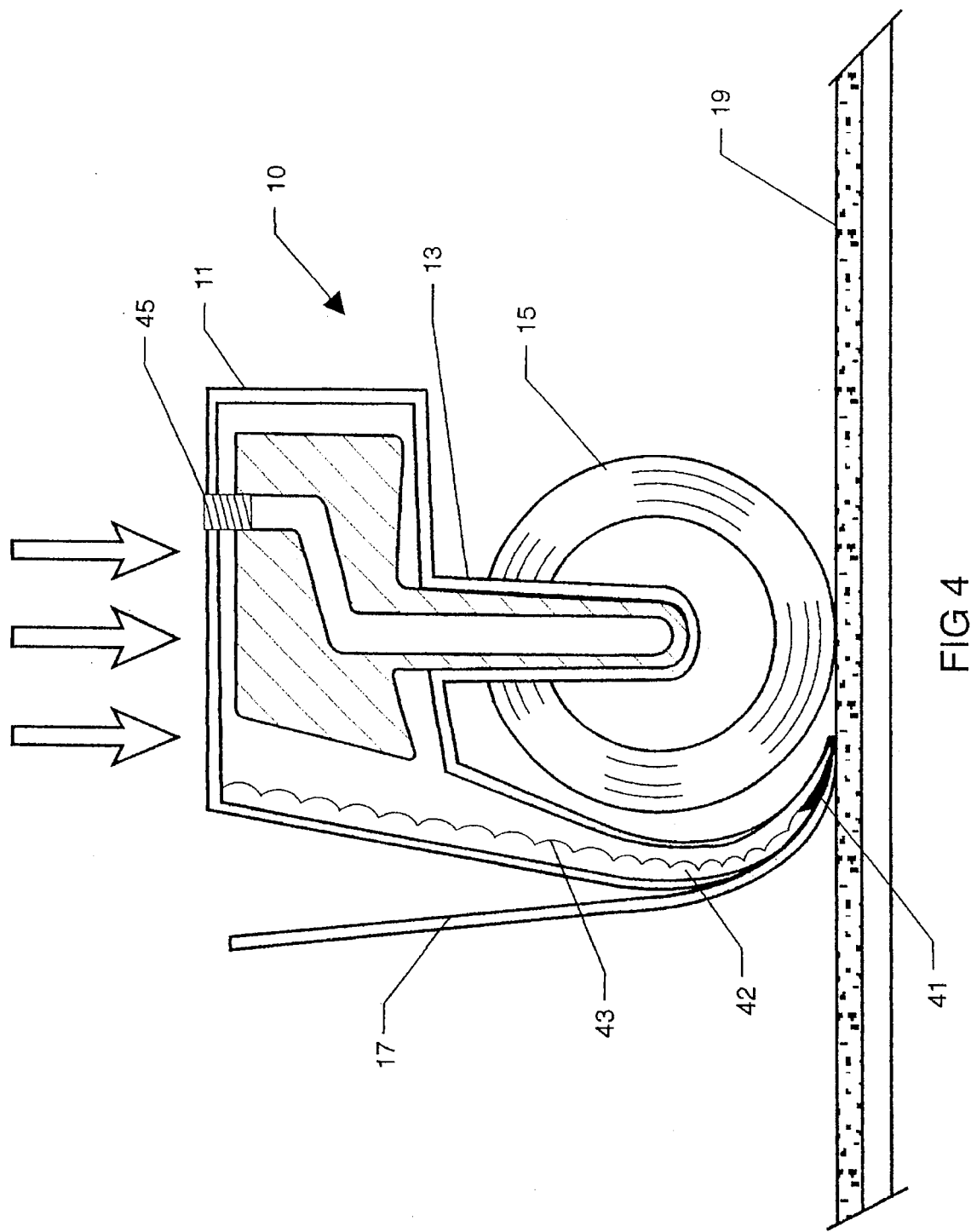
FIG. 4 is a cutaway side view of the application device.

A side section of the application device 10 in FIG. 4 shows the internal components of the device. For reference, prepreg tow 17 is referenced along with the attachment base 11 and the cooled roller 15 supported by arm 13 forming composite 19. Internally, a heating element 41 is located at the tip of the heated shoe. The upper portion 42 of the heated shoe assembly acts as a guide for the incoming prepreg tow 17. An electrical connecting wire 43 provides a means of attaching the heating element 41 to a power supply. The cooling liquid is supplied to the cooled roller through an insulated area by coolant tube 45.

The advantage and features of the application device are numerous. The device allows the immediate transition of a powder-coated prepreg tow line to above glass transition temperature and immediately thereafter, provides an under pressure temperature decrease to below glass transition temperature. The result is a uniform application of the ribbon with a uniformly filled material. Internal voids are minimized or eliminated. The surface is uniformly even and the material thickness is likewise maintained at a uniform value. The heated shoe assembly, having a curvilinear contact surface, provides for a smoothly and steadily increasing pressure (a continuous pressure gradient) on the work piece. This continuous pressure gradient is applied while the heating of the work piece to approximately 100° C. above the glass transition temperature for the particular work piece. The prepreg lay-up is thereby maintained at a precise pre-selected pressure during the glass transition. The cooling roller of the device is positioned immediately behind the heated shoe contact surface. This positioning allows pressure to be continuously applied to the work piece during both heating through glass transition and then cooling down below glass transition. There is no point during the heat up/cool down cycle where the material is not under pressure with the exception of the very small physical space separating the shoe contact surface and the roller. Additionally, the trailing edge of the shoe tip tends to disperse any slag prior to any significant buildup. As a result, a very high quality material is produced, free of void area, and free of residual stresses.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A device for applying composite prepreg comprising:
   an attachment base having means for attaching to a conventional robotic lay-up machine and having an electrical supply and cooling fluid supply;
   a heated shoe assembly attached to said attachment base and enclosing a means for heating said shoe assembly; and
   a pressure roller rotatably attached to said attachment base, said roller having a means for cooling which comprises an external cooling shoe.

2. A device for applying composite prepreg as in claim 1 wherein said external cooling shoe comprises a cooling shoe having an internal chamber for receiving a cooling fluid.

* * * * *